United States Patent Office 3,366,550
Patented Jan. 30, 1968

3,366,550
METHOD FOR THE FERMENTATIVE PRODUCTION OF 5-FLUOROURACIL RIBOTIDE
Kiyoshi Nakayama, Sagamihara-shi, and Haruo Tanaka, Tokyo, Japan, assignors to Kyowa Hakko Kogyo Co., Ltd., Chiyoda-ku, Tokyo, Japan, a corporation of Japan
No Drawing. Filed Feb. 19, 1965, Ser. No. 434,110
9 Claims. (Cl. 195—28)

The present invention is concerned with the production of 5-fluorouracil ribotide:

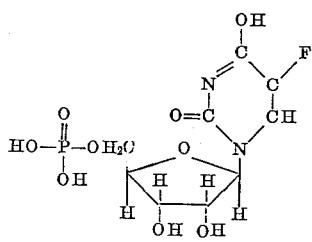

which is of importance as an antagonistic agent of nucleic acid metabolism and is also useful in biochemical research.

The primary object of this invention is the development of the commercially feasible, i.e. low cost and high yield, method for the production of 5-fluorouracil ribotide. Briefly stated, this object is realized by the expendient of offecting fermentation of a fermentable nutrient medium, i.e. a culture medium which contains fermentable carbon and nitrogen sources, as well as—according to the present invention—5-fluorouracil, said fermentable medium being utilizable by *Brevibacterium ammoniagenes* for the conversion of the said 5-fluorouracil into the objective 5-fluorouracil ribotide. The 5-fluorouracil can be added to the culture medium at any stage of the fermentation process, i.e. at the beginning or during the progress of the culturing.

The medium itself, except for the presence of the said added 5-fluorouracil, is of the type and composition normally employed for the culture of *Brevibacterium ammoniagenes*. Thus, use can be made of media which contain appropriate amounts of carbohydrates or other carbon sources (glucose, starch hydrolysates, molasses, etc.), nitrogen sources (urea, ammonium chloride, ammonium nitrate, etc.), inorganic compounds (potassium phosphate) magnesium sulfate, calcium chloride, etc.) and natural substances with nitrogen (corn steep liquor, yeast extract, meat extract, peptone, fish meal, etc.). When use is made of a *Brevibacterium ammoniagenes* strain with a specific nutritional requirement, the appropriate nutrient to satisfy the growth requirement is added to the culture medium. The 5-fluorouracil, the presence of which in the culture medium is of the essence of the present invention, is added to the culture medium—composed as precedingly indicated—all at one time at the beginning or during the course of the fermentation or intermittently in small portions during the course of the latter.

The fermentation itself proceeds in manner per se conventional for the culture of *Brevibacterium ammoniagenes*, i.e. is carried out aerobically, by submerged or shaking culture, at a temperature of 20° to 40° C. at a pH of 5.5 to 9.0, until there is a maximum accumulation of uridylic acid in the fermentation broth and in the bacteria cells, usually for a period of about 2 to 8 days.

Upon completion of the fermentative conversion of the 5-fluorouracil into the objective 5-fluorouracil ribotide, the latter is recovered from the fermentation broth by any of the well known and per se conventional methods for recovering fermentative method, precipitation method, extraction method, etc.

The following is an illustrative but non-limitative example of a presently preferred embodiment of the invention. Parts by weight bear the same relation to parts by volume as do grams to milliliters. Percentages are by weight unless otherwise indicated.

Example 1

*Brevibacterium ammoniagenes* (ATCC-6872) is inoculated into a culture medium consisting of

| | | |
|---|---|---|
| Glucose | percent | 2 |
| Peptone | do | 1 |
| Yeast extract | do | 1 |
| NaCl | do | 0.3 |
| Biotin | μg. (gammas) | 30 |

Remainder water ad 1 liter.

and incubation allowed to proceed at 30° C. for 24 hours.

Ten percent by volume of the thus obtained inoculum is inoculated into fermentation medium of the composition:

| | | |
|---|---|---|
| Glucose | grams | 100 |
| Urea | do | 6 |
| K$_2$HPO$_4$ | do | 10 |
| KH$_2$PO$_4$ | do | 10 |
| MgSO$_4$·7H$_2$O | do | 10 |
| CaCl$_2$·2H$_2$O | do | 0.1 |
| Yeast extract | do | 10 |
| Biotin | μg. (gammas) | 30 | per liter of water. The pH of the medium is adjusted to 8.0 with NoOH. (Note. Sterilization of the fermentation medium is preliminarily carried out in a pressurized sterilizer (1 kg./cm.$^2$) for 10 minutes.)

After 72-hours-culture, 5-fluorouracil is added to the fermentation liquor in such amount as to be present in the latter in a concentration of 2 milligrams per milliliter (2 grams per liter). Culturing is continued as before for 24 more hours. As a result, 4.6 milligrams per milliliter (4.6 grams per liter) of 5-fluorouracil ribotide is accumulated in the fermentation liquor.

The so-produced 5-fluorouracil ribotide is isolated from the reaction mixture in any suitable and per se conventional manner (as e.g. by adsorption to an ion exchange resin from which it is thereafter eluted), the particular mode of isolation not being per se part of the present invention. 5-fluorouracil ribotide is a known compound and has heretofore been recovered from reaction mixtures containing the same.

Example 2

The same procedure as in Example 1 is carried out except that as the microorganism used *Brevibacterium ammoniagenes* ATCC-6871, 15750, 15751 instead of *Brevibacterium ammoniagenes* ATCC-6872 used in Example 1. The amount of 5-fluorouracil ribotide accumulated after cultivating for 96 hrs. is shown in Table 1 below.

TABLE 1

| *Brevibacterium ammoniagenes*: | 5-fluorouracil ribotide accumulated (mg./ml.) |
|---|---|
| ATCC-6871 | 4.5 |
| ATCC-15750 | 4.7 |
| ATCC-15751 | 4.9 |

What is claimed is:
1. A fermentative process for the production of 5-fluorouracil ribotide which comprises culturing *Brevibacterium ammoniagenes* under aerobic conditions in an aqueous nutrient medium containing 5-fluorouracil whereby fermentative conversion of the latter into 5-fluorouracil ribotide takes place, and continuing the conversion until significant quantities of the latter have been produced.

2. A process according to claim 1 wherein the culturing is effected under submerged aerobic conditions.

3. A process according to claim 1 wherein the microorganism is *Brevibacterium ammoniagenes* ATCC–6872.

4. A process according to claim 1 wherein the microorganism is *Brevibacterium ammoniagenes* ATCC–6871.

5. A process according to claim 1 wherein the microorganism is *Brevibacterium ammoniagenes* ATCC–15750.

6. A process according to claim 1 wherein the microorganism is *Brevibacterium ammoniagenes* ATCC–15751.

7. In a process for the culturing of *Brevibacterium ammoniagenes* aerobically in an aqueous nutrient medium containing carbon and nitrogen sources, the improvement of introducing 5-fluorouracil into said medium at any stage of the culturing period whereby conversion of the said 5-fluorouracil into 5-fluorouracil ribotide takes place, and continuing the culturing until substantial quantities of said ribotide have accumulated.

8. The improvement according to claim 7, wherein said 5-fluorouracil is present in said nutrient medium from the beginning of the culturing period.

9. The improvement according to claim 7, wherein the 5-fluorouracil is introduced into the nutrient medium after culturing has continued for a considerable period of time in the absence of 5-fluorouracil, and thereafter continuing said culturing until substantial quantities of 5-fluorouracil ribotide have accumulated.

References Cited

FOREIGN PATENTS 672,274  10/1963  Canada.

ALVIN E. TANENHOLTZ, *Primary Examiner.*